United States Patent
Schroeder

(10) Patent No.: US 6,666,118 B2
(45) Date of Patent: Dec. 23, 2003

(54) PISTON SKIRT TURNING TOOL AND METHOD

(75) Inventor: Kenneth Erich Schroeder, Sanford, MI (US)

(73) Assignee: General Motors Corporation, Detroit, MI (US)

( * ) Notice: Subject to any disclaimer, the term of this patent is extended or adjusted under 35 U.S.C. 154(b) by 17 days.

(21) Appl. No.: 09/811,270

(22) Filed: Mar. 19, 2001

(65) Prior Publication Data

US 2002/0134206 A1 Sep. 26, 2002

(51) Int. Cl.$^7$ .............................. B23B 1/00; B23B 5/00
(52) U.S. Cl. ........................................ 82/1.11; 82/114
(58) Field of Search ...................... 82/1.11, 114, 902, 82/47, 11, 13; 407/113–117

(56) References Cited

U.S. PATENT DOCUMENTS

| | | | |
|---|---|---|---|
| 3,721,163 A | * | 3/1973 | Hill et al. |
| 4,075,934 A | * | 2/1978 | Wacker et al. |
| 4,638,694 A | * | 1/1987 | Slee ................................ 82/18 |
| 4,739,684 A | | 4/1988 | Brown et al. ....................... 82/1 |
| 4,752,995 A | | 6/1988 | Collyear et al. ............ 29/156.5 |
| 4,987,865 A | * | 1/1991 | Schenkel ................ 123/193 P |
| 5,374,142 A | * | 12/1994 | Masseth ........................ 407/23 |
| 5,954,459 A | * | 9/1999 | Noguchi et al. ............... 408/59 |
| 6,220,795 B1 | * | 4/2001 | Mathews .................... 408/1 R |
| 6,257,807 B1 | * | 7/2001 | Heinloth ...................... 407/113 |
| 6,328,504 B1 | * | 12/2001 | Kinukawa .................... 407/114 |

FOREIGN PATENT DOCUMENTS

| DE | 4434297 A1 | 9/1994 |
|---|---|---|
| DE | 10018452 A1 | 4/2000 |

* cited by examiner

*Primary Examiner*—Jacob K. Ackun
*Assistant Examiner*—Jamila O Williams
(74) *Attorney, Agent, or Firm*—Leslie C. Hodges

(57) ABSTRACT

A single point turning tool has a tip including a cutting edge with a tip radius and a linear portion added on one side of and slightly behind the point to form a cutting edge with a linear portion and a protruding portion. The protruding extends beyond the plane of the linear portion which, in turn, extends normal to a longitudinal axis on which the tip radius is centered. During manufacture of a piston, the turning tool is positioned with the linear portion aligned generally with the plane of the finished outer surface. The piston is turned while the tool cuts a helical path or turn around the skirt surface by advancing the tool each turn a desired dimension or lead that is greater than the width of the protruding portion but not greater than the combined widths of the linear and protruding portions. The resulting skirt surface is a series of sequentially adjacent turns, each of which includes a shallow valley, preferably with slightly sloping sides, and each turn has a width equal to the width of the protruding portion of the tool and an adjacent flat or linear portion having a width equal to the difference between the lead of the helix and the width of the adjacent valley.

5 Claims, 2 Drawing Sheets

PISTON SKIRT TURNING TOOL AND METHOD

TECHNICAL FIELD

This invention relates to turning tools and methods and, more particularly, to tools and methods for turning piston skirts to form sculptured bearing surfaces.

BACKGROUND OF THE INVENTION

It is known in the art relating to machining of piston skirts to form sculptured bearing surfaces in various ways. Among them are grinding of the skirt surface with a dressed grinding wheel shaped to obtain the desired surface configuration. A common configuration appears in cross section as a sine wave and may be formed with spacing between peaks of about 0.50 to 1.50 mm and a depth of 0.005 to 0.05 mm. Another method is to turn the piston skirt with a single point turning tool to obtain a helical pattern of shallow grooves and peaks. A currently used tool has a tip radius of about 0.76 mm and turns the skirt with a helical lead of about 0.29 mm to form shallow arcuate valleys about 0.014 mm deep spaced between angular peaks. With this configuration, the peaks provide a minimum of bearing surface and have been found to wear down, during use of the piston in an engine, to form bearing surface plateaus between the valleys. The plateaus form bearing surfaces that engage a surrounding cylinder and are lubricated by wedge oil films present in the adjacent valleys of the skirt surface configuration. However, the wear may increase the piston-to-bore diametral clearance enough to adversely affect piston secondary motion and noise generation.

SUMMARY OF THE INVENTION

The present invention preferably provides a single point turning tool having a tip including a cutting edge with a tip radius the same as or similar to the currently used tool. However, a flat or linear portion is added on one side of and slightly behind the point of the tip radius to form a cutting edge with a linear portion and a protruding portion. The protruding portion consists of that portion of the tip radius that extends beyond the plane of the linear portion which, in turn, extends normal to a longitudinal axis on which the tip radius is centered. In a broader context, the protruding portion could include curvatures other than arcuate and/or could be formed with non curved edges within the scope of the invention. Preferably, the cutting edge also includes lead-in radii or curved surfaces connecting the protruding portion on one side and the linear portion on the other side with angled sides of the tip.

During manufacture of a piston, the turning tool is used to finish the outer surface of the piston skirt. The tool is preferably positioned with the linear portion aligned generally with the cross sectional direction or plane of the finished outer surface. The piston is turned while the tool cuts a helical path or turn around the skirt surface by advancing the tool each turn a desired dimension or lead that is greater than the width of the protruding portion but not greater than the combined widths of the linear and protruding portions. The tool is preferably controlled by a CNC machine which allows the skirt profile to have any desirable shape, such as cylindrical, tapered or barrel shaped with a round, oval or modified transverse cross section. The turning tool may be advanced in either direction along the piston skirt. As the piston is turned, the protruding portion cuts a valley of equal width in the surface and the linear portion cuts an adjacent plateau on the remainder of each turn.

The resulting skirt surface is a series of sequentially adjacent turns each of which has a width equal to the lead of the helical cut. The surface of each turn includes a shallow valley preferably having slightly sloping sides and a width equal to the width of the protruding portion of the tool. Each turn also includes an adjacent flat or linear portion (as seen in longitudinal cross section) having a width equal to the difference between the lead of the helix and the width of the adjacent valley.

In an exemplary embodiment, each plateau has a width of about 34 percent of the total width of the turn (or the lead of the cut). Thus the width of each plateau forms a bearing surface which is about half the width of the adjacent valleys. The valleys are shallow arcs that have slightly sloping sides which, in operation of the piston, form oil film wedges fed to the bearing surfaces in both directions of motion of the piston. A skirt profile having well lubricated bearing surfaces capable of sustaining thrust loads on the piston without excessive break in wear is thus provided by use of the novel turning tool combined with the method of its use.

These and other features and advantages of the invention will be more fully understood from the following description of certain specific embodiments of the invention taken together with the accompanying drawings.

DESCRIPTION OF THE PREFERRED EMBODIMENT

Figure 1:
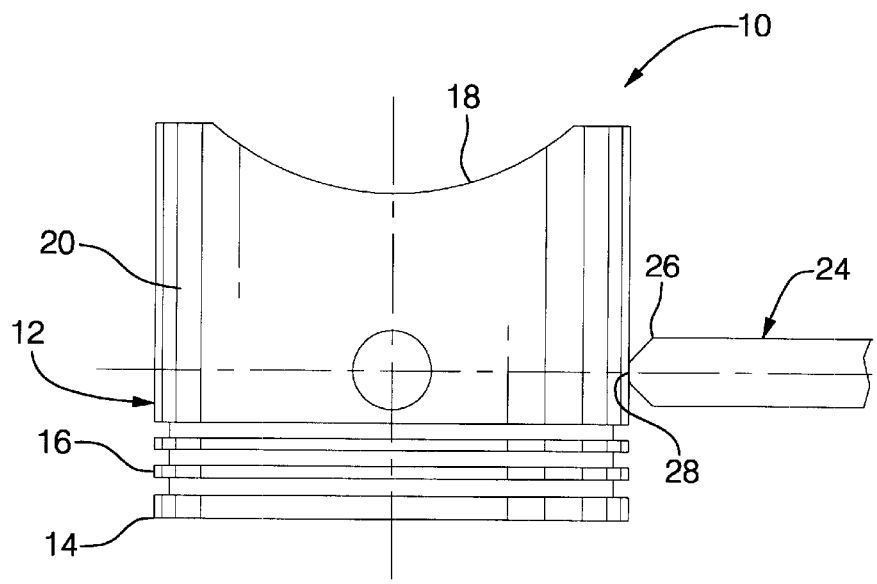
FIG. 1 is a side view of a piston having a skirt being turned by a turning tool in accordance with the invention.

Referring first to FIG. 1 of the drawings in detail, numeral 10 generally indicates a machining setup including an engine piston 12 shown inverted as it might be mounted for turning in a CNC machine, not shown. Piston 12 includes a crown 14 with a ring belt 16 and an adjacent skirt 18 having an outer surface 20 of any desired generally cylindrical (including tapered or barrel shaped) configuration. A single point turning tool 24 is shown having a tip 26 with a cutting edge 28 engaging the skirt 18 in process of turning the surface 20. Preferably, the skirt is turned with a helical cut as the tool 24 travels along the surface 20 in a helical path with a lead selected to finish the surface in a single pass. Alternatively, the skirt could be finished by sequential plunge cutting with the tool to form a plurality of annular turns or rings on the surface, but this is not a preferred method.

Figure 2:
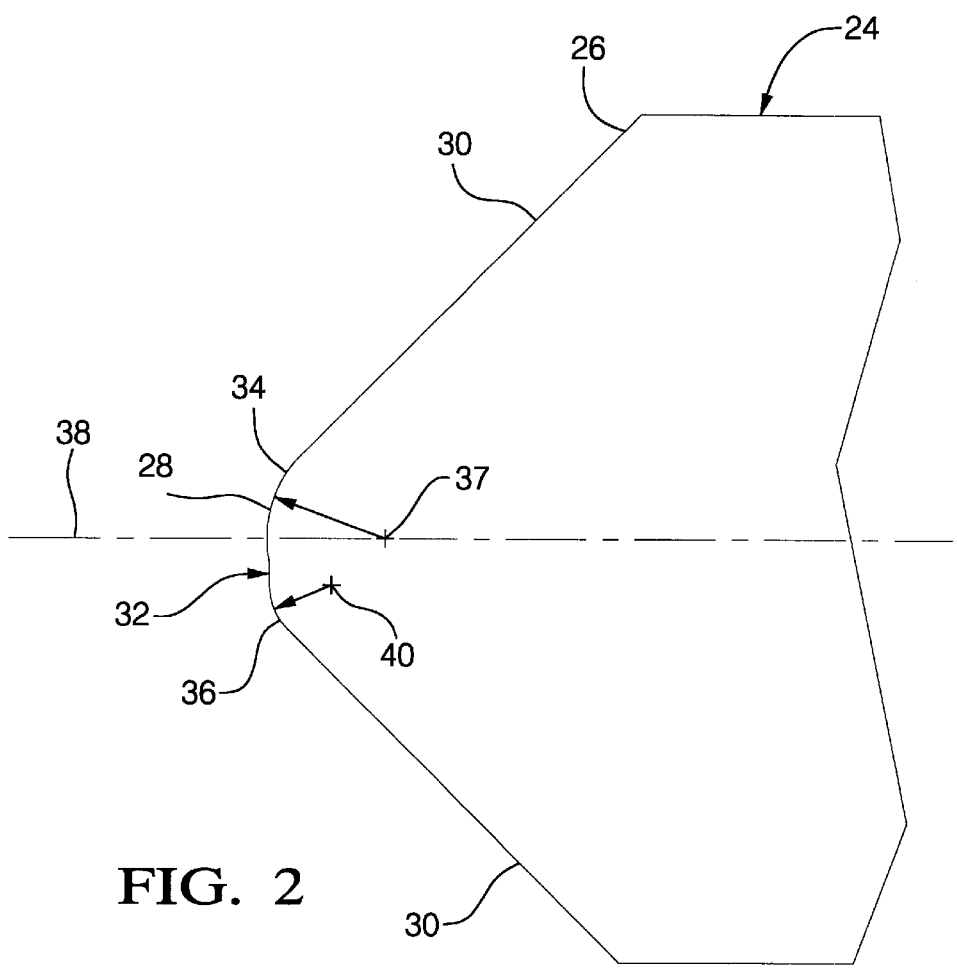
FIG. 2 is a top view of the tip of the turning tool in FIG. 1.

FIG. 2 is an enlarged view showing the tip 26 of the tool 24 including angled sides 30 leading to the cutting edge 28. The cutting edge includes an off center end portion 32 connected with the sides 30 by first and second lead-in radii 34, 36. The first radius 34 is drawn from a first center 37 located on a longitudinal axis 38 of the turning tool 24 and the second radius 36 is drawn from a second center 40 spaced to one side of the axis 38.

Figure 3:
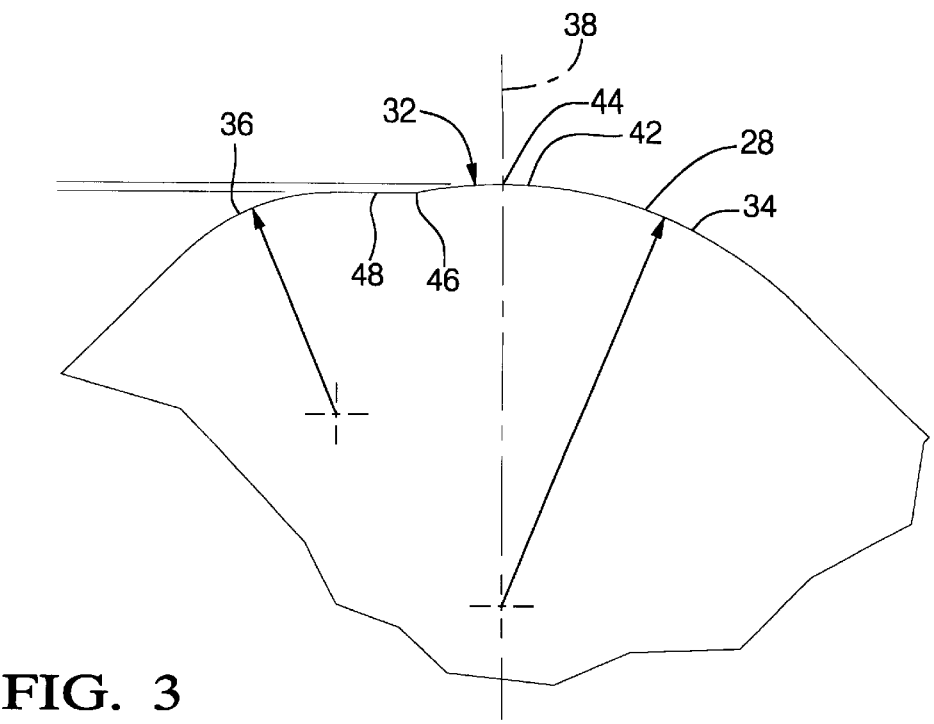
FIG. 3 is a greatly enlarged view of the cutting edge of the turning tool.

FIG. 3 shows the end portion 32 of the cutting edge 28, greatly enlarged to show details of the cutting edge configuration. The end portion 32 includes the first radius 34, which continues as the radius of a protruding portion 42 formed as an arc of the same radius extending arcuately to and beyond a forward point 44 on the axis 38 on which the radius 34 and arc 42 are centered. The protruding portion or arc 42 extends past the axis to a second point 46 spaced to one side of and slightly behind the forward point 44. From the second point 46, a generally linear or straight portion 48 of the cutting edge extends laterally outward in a direction normal to the axis 38 for a distance equal to the offset of the second center 40 from the axis 38. The cutting edge 28 then terminates with the second radius 36 connecting the linear portion with one of the angled sides 30 of the tip 26. The protruding portion 42 of the cutting edge 28 is defined herein as that portion of the cutting edge that extends beyond the plane or line of the linear portion 48 of the cutting edge 28.

In the embodiment of a turning tool illustrated, the representative dimensions of the tip include a side, angled at about 45 degrees relative to the axis and connecting with the first lead-in radius 34 of about 0.76 mm, a previously used radius for skirt turning tool tips. The protruding portion 42 continues from the arc 34 with the same radius of about 0.76 mm through the forward point 44 to the second point 46, extending equally on both sides of the axis 38 for a total width of the protruding portion of about 0.19 mm. The linear portion 48 extends laterally from point 46 for any desired distance, in this case for about 0.20 mm to the beginning of the second lead-in radius 36, which has a radius dimension of about 0.40 mm. The linear portion 48 in this instance is nearly equal to the width of the protruding portion 42 for a total width of the linear and protruding portions of about 0.39 mm. The height, or projection, of the protruding portion 42 beyond the linear portion 48 is very small, on the order of 0.006 mm. However, the extent of the protrusion could be increased if desired up to at least 0.01 mm without departing from the intended scope of the invention.

In use, the turning tool 24 is preferably positioned with the linear portion 48 aligned generally with the cross sectional direction or plane of the finished outer surface 20 of the piston skirt. The piston 12 is rotated while the tool cuts a helical path or turn around the skirt surface 20 by advancing the tool 24 each turn a desired dimension or lead that is greater than the width (0.19 mm) of the protruding portion but not greater than the combined widths (0.39 mm) of the linear and protruding portions. In the present instance, the lead dimension is about 0.29 mm, or midway between the available extremes for this tool 24. The tool is preferably controlled by a CNC machine which allows the skirt profile to take any desirable shape, such as cylindrical, tapered or barrel shaped with a round, oval or modified transverse cross section. The turning tool 24 may be advanced during turning in either direction along the piston skirt. As the piston is turned, the protruding portion 42 cuts a shallow valley 50 of equal width (0.19 mm) in the skirt surface 20 and the linear portion 48 cuts an adjacent plateau 52 on the remainder (0.10 mm) of each turn 54.

Figure 4:
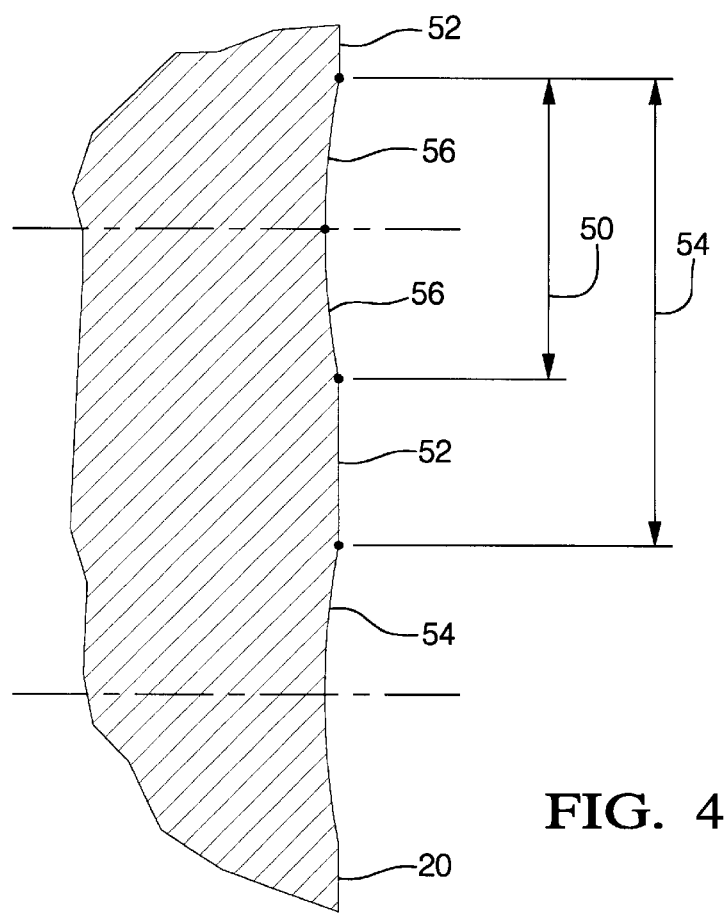
FIG. 4 is an enlarged view of the resulting piston skirt surface showing the valleys and linear bearing surface formed on the skirt by the tool and method of the invention.

The resulting skirt surface, as seen in FIG. 4, is a series of sequentially adjacent turns 54, each of which has a width (0.29 mm) equal to the lead of the helical cut. The surface of each turn 54 includes a shallow valley 50, preferably having slightly sloping sides 56 and a width (0.19 mm) equal to the width of the protruding portion 42 of the tool. The depth of the valleys is only about 0.006 mm. However, it could be varied up to a depth of at least 0.01 mm, if desired, by increasing to that dimension the protrusion of the protruding portion 42 of the tool 24 beyond the linear portion 48. Each turn also includes an adjacent flat or linear plateau 52 (as seen in cross section) having a width (0.10 mm) equal to the difference between the lead of the helix (or the width of the turn 54) and the width of the adjacent valley 50.

In an exemplary embodiment, each plateau 52 has a width of about 34 percent of the total width of the turn 54 (or the lead of the cut). Thus the width of each plateau forms a bearing surface which is about half the width of the adjacent valleys. The widths of the plateaus could be varied, within the scope of the invention, to between 20 to 50 percent of the width of each turn, thus varying the effective bearing area of the skirt as desired. The valleys are shallow arcs that have slightly sloping sides 56 which, in operation of the piston, form oil film wedges fed to the bearing surfaces 52 in both directions of motion of the piston 12. A skirt profile having well lubricated bearing surfaces capable of sustaining thrust loads on the piston without excessive break in wear is thus provided by use of the novel turning tool 24 combined with the method of its use.

The approximate dimensions, angles and ratios indicated for the exemplary embodiment illustrated may be altered as desired to suit various sized engines, piston applications and operating conditions of the engine and piston without departing from the intended scope of the invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A turning tool for machining piston skirts, said tool having a tip with a cutting edge engagable with a piston skirt for cutting material during turning of the skirt to provide a sculptured bearing surface, said cutting edge including:

a protruding portion including a shallow curvature extending laterally in opposite directions and rearward from a forward point; and a generally linear portion extending laterally outward from a second point of the protruding portion, said second point spaced to one side of and slightly behind said forward point;

wherein said protruding portion extends beyond said linear portion a distance not greater than 0.01 mm, said protruding portion is an arc centered on a longitudinal axis extending through said forward point, and said second point lies on the arc to one side of the axis, said linear portion lying normal to said axis, the tool including curved portions connecting the arc and the linear portion with angular sides of the tip;

whereby the tool is adapted to form a turned surface having in cross section a series of bearing plateaus separated by shallow valleys having slightly sloping sides adjoining the plateaus.

2. A method of using a turning tool as in claim 1 to form a sculptured bearing surface on a skirt of a piston, said method comprising:

turning the surface of the piston skirt with the linear portion of the turning tool substantially aligned with the turned skirt surface wherein, at each axial cross section of the skirt, the tool cuts a series of sequentially adjacent turns each having a width between the total width of the linear and protruding portions together and the width of the protruding portion alone, such that the difference between the width of each turn and the width of the protruding portion constitutes the width of the associated bearing plateau.

3. A method as in claim 2 wherein turning of the surface is conducted by a single point tool cutting a helix having a lead equal to the width of each turn.

4. A method as in claim 2 wherein the width of each bearing plateau is between 20 and 50 percent of the width of each turn.

5. A method as in claim 4 wherein said width of each bearing plateau is about one third the width of each turn.

* * * * *